(12) United States Patent
Sauer et al.

(10) Patent No.: US 10,856,220 B2
(45) Date of Patent: Dec. 1, 2020

(54) ENERGY-EFFICIENT SIGNAL PROCESSING

(71) Applicant: Apple Inc., Cupertino, CA (US)

(72) Inventors: Matthias Sauer, San Jose, CA (US); Bernd W. Adler, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 456 days.

(21) Appl. No.: 15/268,841

(22) Filed: Sep. 19, 2016

(65) Prior Publication Data

US 2017/0181079 A1   Jun. 22, 2017

Related U.S. Application Data

(60) Provisional application No. 62/270,224, filed on Dec. 21, 2015.

(51) Int. Cl.
*H04W 52/02* (2009.01)

(52) U.S. Cl.
CPC .......... *H04W 52/02* (2013.01); *Y02D 70/00* (2018.01); *Y02D 70/122* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/23* (2018.01); *Y02D 70/26* (2018.01)

(58) Field of Classification Search
CPC .......................... H04W 52/02; H04W 72/0473
See application file for complete search history.

(56) References Cited

U.S. PATENT DOCUMENTS

| | | | |
|---|---|---|---|
| 7,526,636 B2 | 4/2009 | Gazsi et al. | |
| 8,024,529 B2 | 9/2011 | Ezzat | |
| 8,095,782 B1 | 1/2012 | Danskin et al. | |
| 9,015,377 B2 | 4/2015 | Wu et al. | |
| 2008/0080468 A1* | 4/2008 | Shen | H04B 1/7105 370/342 |
| 2013/0121157 A1* | 5/2013 | Logvinov | H04W 40/10 370/238 |
| 2014/0086164 A1* | 3/2014 | Kim | H04W 72/1278 370/329 |

(Continued)

*Primary Examiner* — Charles C Jiang
*Assistant Examiner* — Voster Preval
(74) *Attorney, Agent, or Firm* — Kowert, Hood, Munyon, Rankin & Goetzel, P.C.

(57) ABSTRACT

In some embodiments, an apparatus includes first and second signal processing circuitry configured to perform signal processing operations and second signal processing circuitry configured to perform signal processing operations, wherein the second signal processing circuitry includes a smaller amount of processing resources than the first signal processing circuitry. In some embodiments, the apparatus includes one or more storage elements configured to store context information for the second signal processing circuitry and the one or more storage elements are accessible to the first signal processing circuitry. The apparatus may be configured to select one of the first and second signal processing circuitry based on the complexity of input problems, the amount of transmission resources assigned to the apparatus, etc. In some embodiments, intermediate results of from the second signal processing circuitry are used as inputs to an operation performed by the first signal processing circuitry.

18 Claims, 6 Drawing Sheets

(56) References Cited

U.S. PATENT DOCUMENTS

| | | | |
|---|---|---|---|
| 2014/0112224 A1* | 4/2014 | Jafarian | H04W 52/0209 |
| | | | 370/311 |
| 2014/0120962 A1* | 5/2014 | Merlin | H04W 68/02 |
| | | | 455/466 |
| 2014/0173609 A1* | 6/2014 | Du | G06F 1/3296 |
| | | | 718/102 |
| 2014/0269995 A1* | 9/2014 | Shi | H04L 25/0296 |
| | | | 375/316 |
| 2015/0207680 A1* | 7/2015 | Ivanov | H04B 1/40 |
| | | | 455/73 |
| 2016/0062798 A1* | 3/2016 | Lee | G06F 9/5033 |
| | | | 718/104 |
| 2016/0127997 A1* | 5/2016 | Ang | H04W 76/28 |
| | | | 370/311 |
| 2017/0201420 A1* | 7/2017 | Chen | H04B 7/0877 |
| 2018/0027552 A1* | 1/2018 | Jeong | H04W 24/00 |
| | | | 370/336 |
| 2018/0324003 A1* | 11/2018 | Zirwas | H01Q 21/22 |

\* cited by examiner

ENERGY-EFFICIENT SIGNAL PROCESSING

PRIORITY CLAIM

This application claims the benefit of U.S. Provisional Application No. 62/270,224, filed on Dec. 21, 2015, which is incorporated by reference herein in its entirety.

TECHNICAL FIELD

The present application relates to wireless devices, and more particularly to devices that include different instances of signal processing circuitry with different processing ability and power consumption.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Wireless communication circuitry typically needs to be able to handle peak performance modes (e.g., using a full frequency channel and full resource block allocation). Much of the time, however, lower-performance modes are utilized. For example, a mobile base station may not be able to allocate full frequency resources to a mobile device (e.g., based on congestion) or the mobile device may not need many resources to communicate all necessary data during a given time interval. Using circuitry that is configured to handle peak performance modes during these lower-performance intervals consumes significant power, in some implementations.

BRIEF DESCRIPTION OF THE DRAWINGS

A better understanding of the present subject matter can be obtained when the following detailed description of the embodiments is considered in conjunction with the following drawings, in which.

Figure 1:
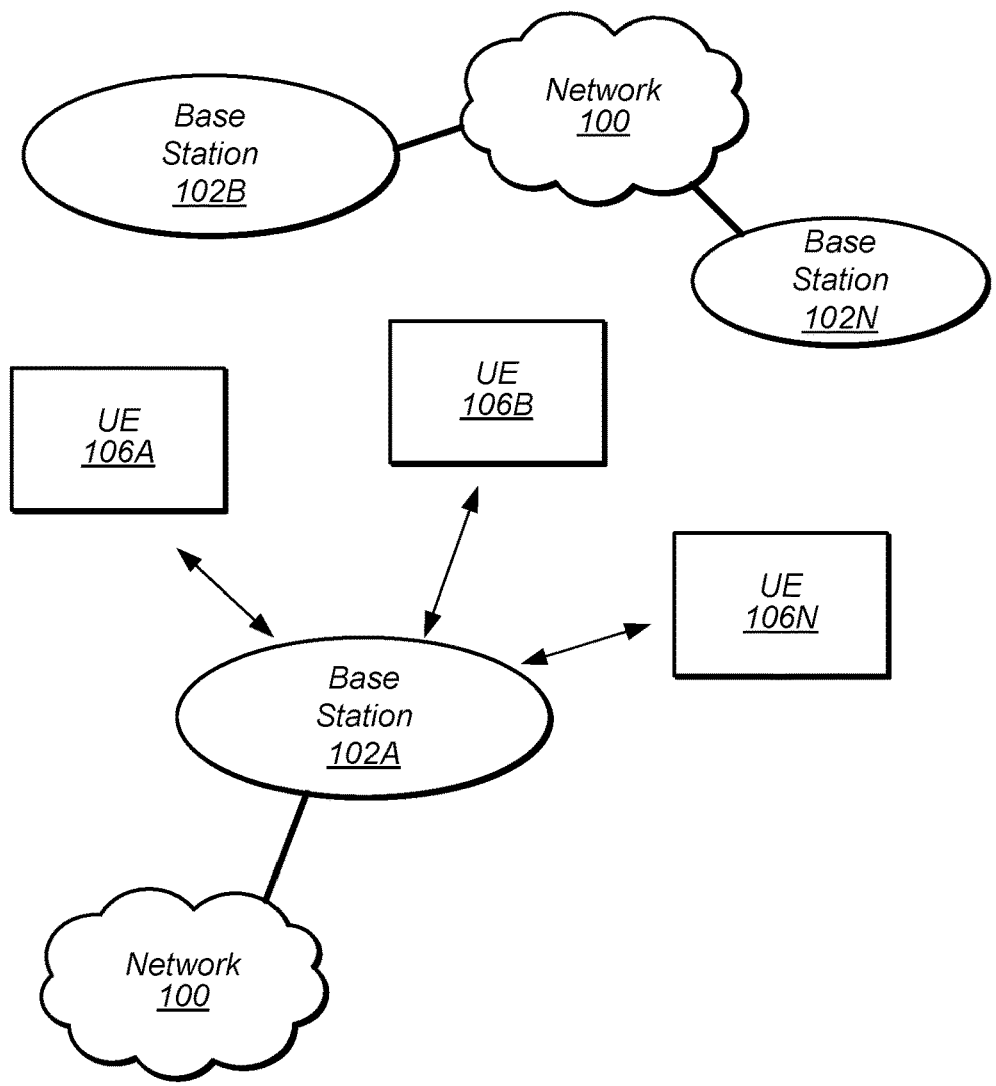
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Acronyms

The following acronyms may be used in the present disclosure.
3GPP: Third Generation Partnership Project
3GPP2: Third Generation Partnership Project 2
APN: Access Point Name
BLER: Block Error Rate (same as Packet Error Rate)
BER: Bit Error Rate
CRC: Cyclic Redundancy Check
DL: Downlink
GBR: Guaranteed Bit Rate
GSM: Global System for Mobile Communications
IMS: IP Multimedia Subsystem
IP: Internet Protocol
LTE: Long Term Evolution
MME: Mobility Management Entity
MO: Message Originating
MT: Message Terminating
NAS: Non-access Stratum
PCC: Policy and Charging Control
PCEF: Policy and Charging Enforcement Function
PCRF: Policy and Charging Rules Function
PCSCF: Proxy Call Session Control Function
PGW: Packet Gateway
PER: Packet Error Rate
QCI: Quality of Service Class Index
QoS: Quality of Service
RRC: Radio Resource Control
SGW: Serving Gateway
SINR: Signal to Interference-and-Noise Ratio
SIR: Signal to Interference Ratio
SNR: Signal to Noise Ratio
Tx: Transmission
UE: User Equipment
UL: Uplink
UMTS: Universal Mobile Telecommunication System
VoLTE: Voice Over LTE

TERMS

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g., a smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless cellular telephone system or cellular radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
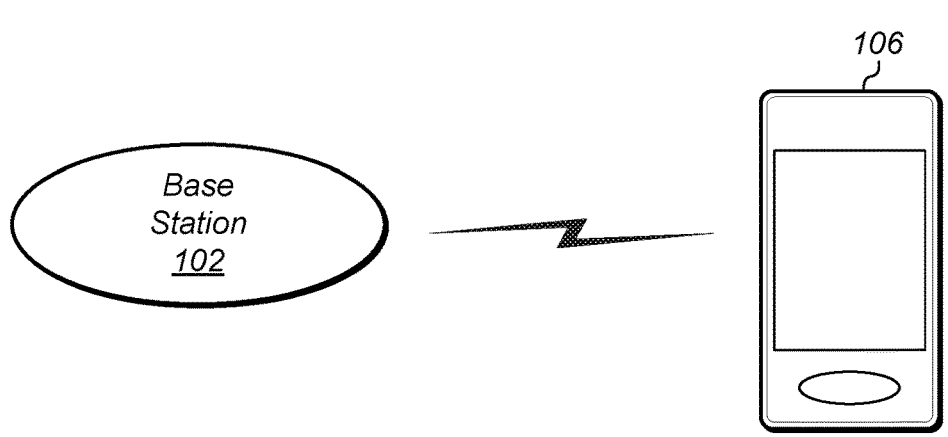
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A-106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices (UEs) and/or between the UEs and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-160N and similar devices over a wide geographic area via one or more cellular communication standards.

Thus, while base station 102A may act as a "serving cell" for UEs 106A-160N as illustrated in FIG. 1, each UE 106 may also possibly come within communication range of, and be capable of receiving signals from, one or more other cells (which might be provided by base stations 102B-N and/or any other base stations), which may be referred to as "neighboring cells." Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A-106N) in communication with a base station 102 (e.g., one of the base stations 102A-102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. Alternatively, or in addition, the UE 106 may include one or more integrated circuits configured to perform any of the method embodiments described herein.

The UE 106 may include one or more antennas for communicating using one or more wireless communication protocols or technologies. In some embodiments, the UE 106 is configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
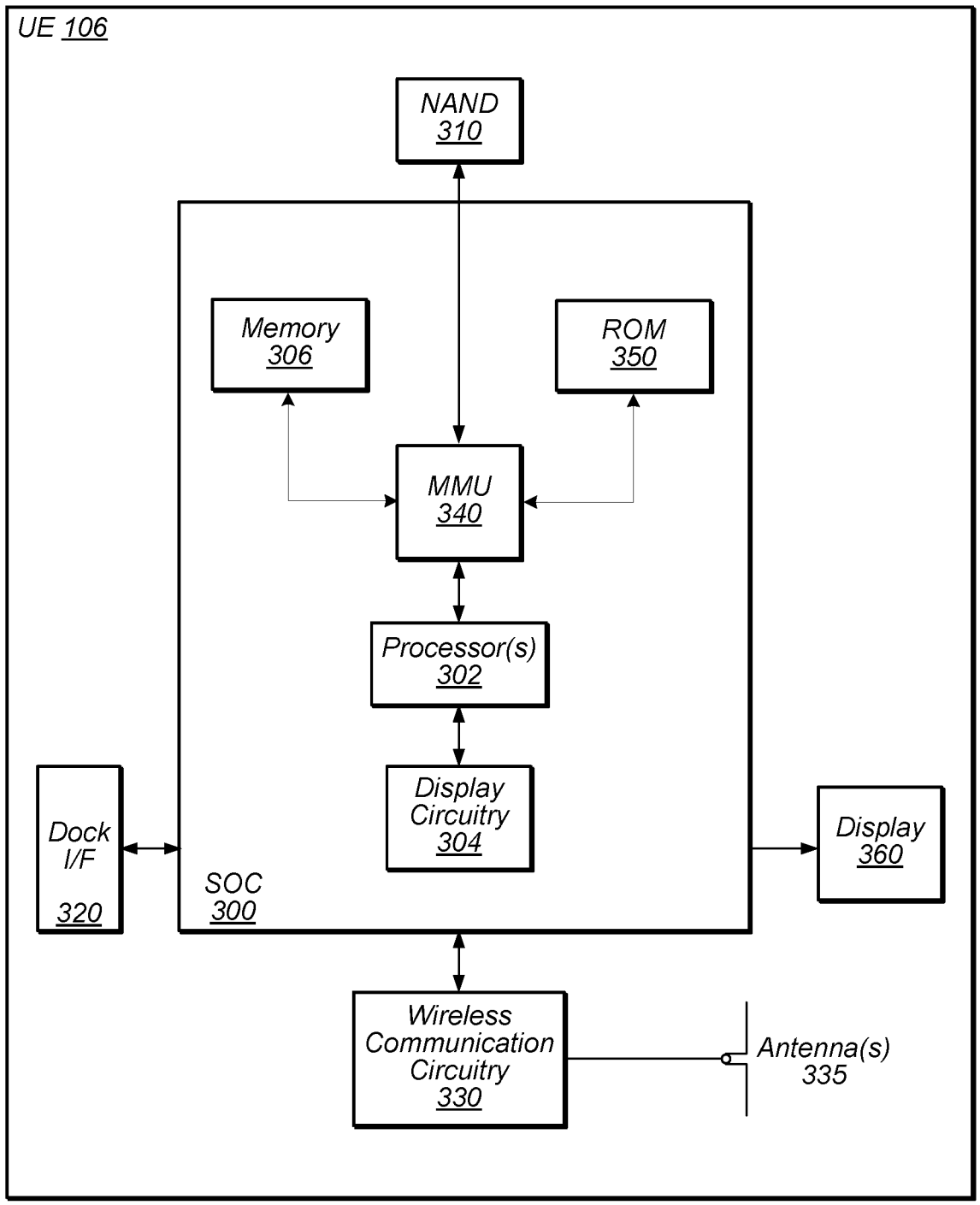
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include processing elements for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features and methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition), the processor 302 of the UE device 106, in conjunction with one or more of the other components 300, 304, 306, 310, 320, 330, 335, 340, 350, 360 may be configured to implement part or all of the features described herein.

Although disclosed embodiments are discussed in the context of a mobile device, similar techniques may be used for non-mobile devices, such as base stations, for example, in other embodiments.

Overview of Problems with Conventional Designs

In many communication systems, such as LTE cellular systems, the radio link can be used in different performance modes (e.g. with different channel bandwidth, throughput, antenna configuration, etc. depending on the mode). The user equipment typically needs to be able to process for peak performance so that the radio resources can be used effectively. Most of the time, however, this peak performance not required or not assigned to a particular user by the network scheduler (e.g. because the scheduler needs to optimize the resource utilization to manage capacity of the radio link among multiple mobile devices).

However, designing and implementing a radio user equipment device (UE) for peak performance typically results in a reduced energy efficiency for modes of operation where less than the peak performance is required.

In traditional implementations this problem may be addressed by means such as power or clock scaling or clock gating parts of the processing hardware that are not required for a given mode. In these implementations, the processing pipeline stages and communication infrastructure are still designed (e.g. in processing word length, maximum achievable clock frequency, HW/SW partitioning, etc.) to handle a peak performance case, which may limit the amount of power reductions that can be achieved.

Overview of Exemplary Embodiments

In some embodiments, a system has (at least) two modes of operation which differ in performance requirements for the receiver and/or transmitter signal processing system. In very generic terms some embodiments implement (at least) two instances of circuitry for a processing stage or processing chain of a mobile radio device. In some embodiments, the two instances are configured to perform the same functionality, but on input data sets of different sizes (e.g., perform the same transform but on input matrices of different sizes, decode incoming radio transmissions but for incoming transmissions of different bandwidths; etc.).

One larger instance, in some embodiments, implements the radio system such that the peak performance case can be handled, e.g. similar to a traditional implementation. This instance may be referred to as a "high-performance" instance. The larger instance is implemented to meet the performance requirements to execute the high computational requirements of a full-scale problem. This may require the use of high-performance circuitry and processing elements (e.g. memories, CPU cores, etc.). Using this larger instance is typically not energy efficient, however, if only a smaller system or problem needs to be executed.

The other smaller instance, in some embodiments, is an implementation of the radio system for a reduced performance mode which is optimized for energy efficiency, e.g. by way of using low leakage transistors, circuit architectures operating at lower specified voltage supplies, lower performance processor cores, smaller amounts of parallel processing circuitry, or a combination of those techniques. Speaking generally, these differences may be referred to as a smaller amount of "processing resources" for performing a given set of operations. This instance may be referred to as a "high-efficiency" instance. In some embodiments, the context (state variables, computation results) of the high efficiency instance are shared with the high-performance instance.

For many signal processing functions, the computation of a "larger" problem (e.g. one for a wider bandwidth) is structurally the same or similar to the computation of the "smaller problem". The computation of the smaller problem may be contained in the larger problem, e.g., the results of the smaller problem may an intermediate result during the computation of the larger problem.

This holds for many signal processing algorithms that can be described recursively (e.g. as tail recursion) and those that can be described iteratively (e.g. many channel estimation and decoding algorithms) and potentially other classes of algorithms. By sharing the context of the high efficiency instance with the high performance instance the radio system can switch quickly and effectively between a high-efficiency mode and a high performance mode as the high-performance instance can complete the computation of the higher performance problems without a need to re-compute the results that are available from the high-efficiency instance.

Exemplary Circuitry

Figure 4:
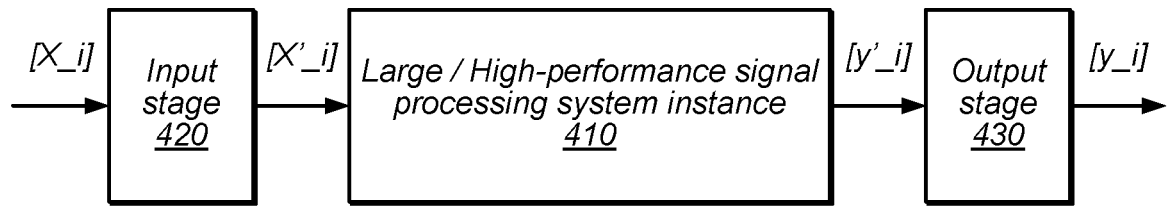
FIG. 4 illustrates a signal processing system with a single high-performance instance.

FIG. 4 shows a conventional signal processing system where a set of input data $X\_i$ is received at an input stage 420 (which may or may not perform actual processing tasks on the input data), forwarded to the high performance system 410 which produces a set of output data, $y'\_i$ which is then passed through an output stage 430, after which the final result, $y\_i$ is available.

Figure 5:
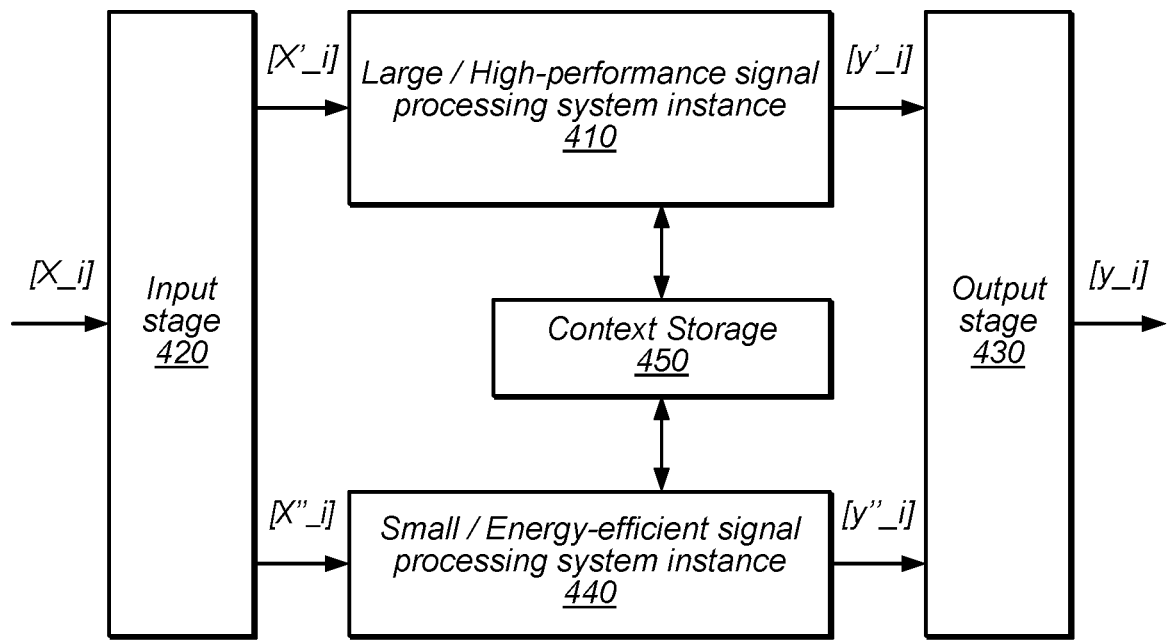
FIG. 5 illustrates a signal processing system with a high-performance instance and a high-efficiency instance, according to some embodiments.
Figure 6:
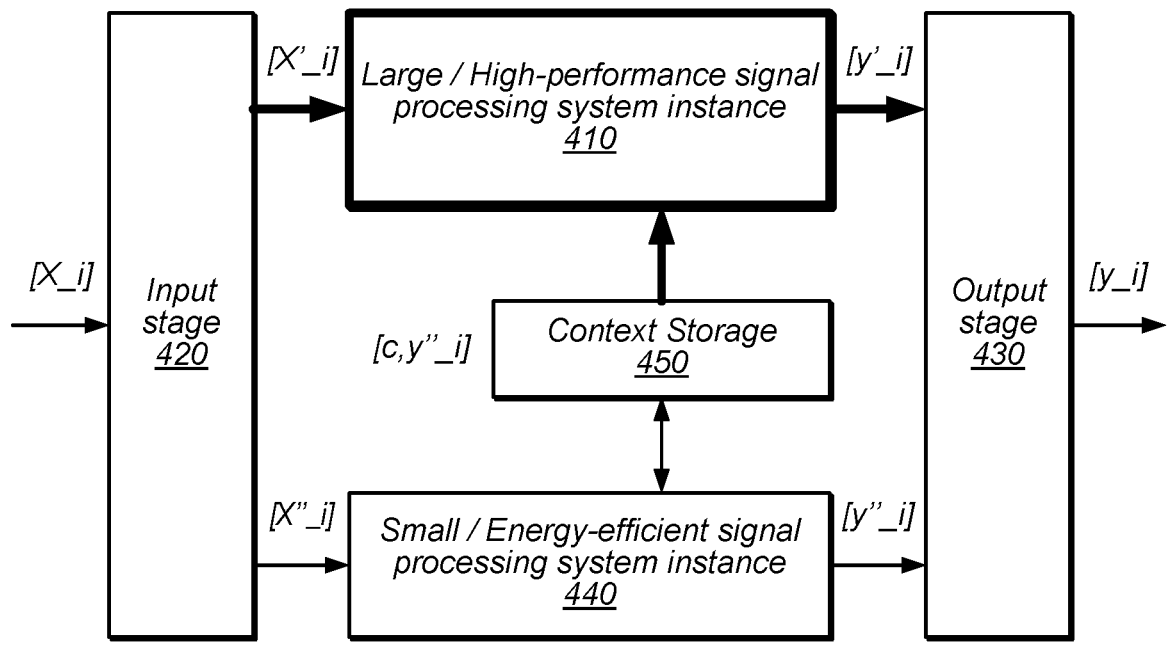
FIG. 6 illustrates a situation in which the high-performance instance of FIG. 5 is in a low-power state.

A general block diagram of an exemplary dual mode solution, according to some embodiments is shown in FIG. 5. In the illustrated embodiment, the high-performance instance 410 and a high-efficiency instance 440 are configured to operate in parallel in some modes or separately in other modes (and one or both instances may be clock gated, as appropriate).

In the illustrated embodiment, the input stage 420 delivers respective subsets $X'\_i$ and $X''\_i$ of the input data set $X\_i$ to the large system 410 and the small system 440. The output stage 430 combines the results $y'\_i$ and $y''\_i$ of both the large and small system to the final result $y\_i$. Both of those subsystems (including their respective part of the input and output stages) may be put into a low power mode (e.g. through power gating).

In the illustrated embodiment, the small, energy efficient system provides access to its context information, such as certain state variables, intermediate, and/or end results via context storage element 450. The large system 410 may access this context in order to compute the large problem. In some embodiments, the system may realize that it needs the high-performance instance 410 only after processing some of the input data using the high-efficiency instance 440. Using the output of the high-efficiency instance 440 as intermediate results may increase overall performance, in this situation. In other embodiments, the apparatus may intentionally perform a first part of an operation using only the high-efficiency instance 440 and a second part of the operation using the high-performance instance 410 (and/or vice versa). For example, in an iterative receiver, the high-efficiency instance 440 may be used in good signal conditions and terminate after a few iterations. In bad signal conditions, however, processing may be transferred to the high-performance instance 410. As another example, switching between instances may be performed based on the allocated number of resource blocks for a given mobile device.

In some embodiments, a control input line is used to select the processing mode. This control can be an external input or an inherently derived control state (e.g. if the input stage determines that the input data size or other conditions require only a reduced signal processing problem to be solved). If the information to decide whether the small or the large system (or both) needs to be executed is contained in the subset of the input data processed by the smaller system, the context of the small system may trigger or may be used to trigger the power state change (from low power state to active states) of the larger system, for example.

The larger signal processing problem may be expressed such that the results of the smaller system are used to compute the result. In that case, the access to the context of the smaller system allows the larger system to be computed more effectively e.g. in order to perform a mode change.

In some embodiments, if the problem/mode requires only the small system to compute the result, the large system is placed in a low power mode (e.g. power gated). Subsequently, if the large problem needs to be computed, e.g. because the conditions change so that more iterations of a channel estimation are required, or because the input data contain information that demand a mode change, the large system is brought back from low power mode. The large system may access the context data of the smaller system during the computation of the result in order to save computation time (because intermediate results had already been computed by the small system).

The large system may also be the only active subsystem e.g. in situations where the mode change between the small and the large system cannot be performed quickly enough.

Figure 7:
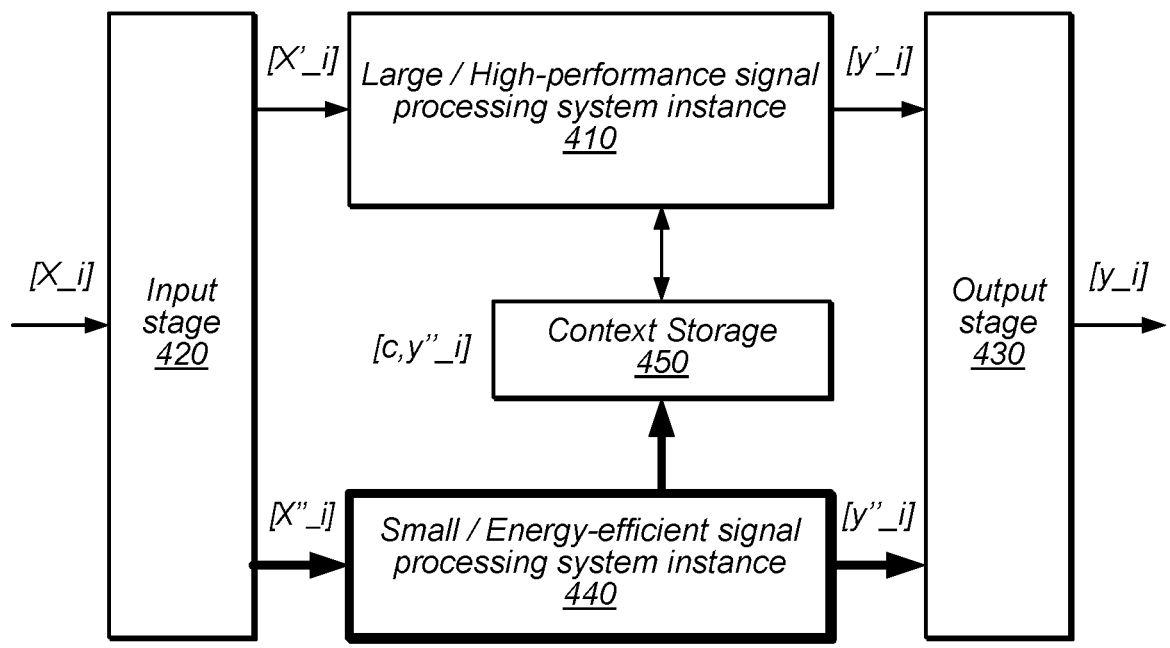
FIG. 7 illustrates a situation in which the high-efficiency instance of FIG. 5 is in a low-power state.

In one mode of operation only the large subsystem may be active, e.g. because the system requires the high-performance computation. This would be similar to a conventional implementation of the signal processing system. This situation is shown in FIG. 7. In this mode, however, the large system 410 may have access to context storage 450.

In another possible mode of operation, the system may initially only operate the small subsystem (operating on a subset of the input data or operating towards a lower performance requirement or both). Initially the large subsystem would be in its low power state. An example of this situation is shown in FIG. 7.

In a third, mixed mode of operation both systems may operate in a joint pipelined fashion and the large system makes use of the context and intermediate results of the small, high-efficient subsystem to compute the complete result.

The system may be configured to switch between the first, second, and/or third mode based on external control signals, based on contents of the input data, based on computation results, etc.

Exemplary Applications

There are many examples of signal processing problems that can be decomposed in a way that allows such a two (or more)-instance implementation. The following examples are discusses for illustrative purposes but are not intended to limit the scope of the problems solved in various embodiments. Examples of such problems include matrix-matrix multiplications or matrix-vector multiplications. For example, the operation:

$$y = Hx = \begin{bmatrix} A & B \\ C & D \end{bmatrix} \begin{bmatrix} x' \\ x'' \end{bmatrix} = \begin{bmatrix} y' \\ y'' \end{bmatrix}$$

can be written as:

$$y = \begin{bmatrix} y' \\ y'' \end{bmatrix} = \begin{bmatrix} Ax' + Bx'' \\ Cx' + Bx'' \end{bmatrix}$$

If we interpret the larger problem as y=Hx and the smaller problem as, e.g., s=Ax', then the following equation describes how the two instances are related:

$$s = Ax'$$
$$t = \begin{bmatrix} 0 & B \\ C & D \end{bmatrix} \begin{bmatrix} x' \\ x'' \end{bmatrix}$$

where the equation for t represents the large, high-performance part of the system. The full system can then be described by the following equation:

$$y = \begin{bmatrix} y' \\ y'' \end{bmatrix} = \begin{bmatrix} s \\ 0 \end{bmatrix} \begin{bmatrix} 0 & B \\ C & D \end{bmatrix} \begin{bmatrix} x' \\ x'' \end{bmatrix}$$

$$\begin{bmatrix} y' \\ y'' \end{bmatrix} = \begin{bmatrix} s \\ 0 \end{bmatrix} + t$$

Thus, the high-efficiency instance may generate the y"_i output which may then be used by the high-performance instance to solve the larger problem and generate the result.

Another example signal processing algorithm that can be decomposed in such a fashion is the fast Fourier transform (FFT) which generally can be expressed recursively (e.g. decimation-in-time or decimation-in-frequency) through subsets of the input, the results of which are permuted and combined with complex "twiddle-factors". There are a variety of factorizations of the FFT (e.g. radix-N, mixed radix FFTs) for which the proposed architecture can operate efficiently. If an FFT of size n=$n_i n_k$ (i.e. X_i is of size n) has to be computed in the high-performance mode and $n_i$ is the size of the FFT to be computed in the smaller system for the high-efficiency mode, the large system can compute the total result y=FFT(x) from the result y"=FFT(x") of the small system by computing, e.g.

$$l = \begin{bmatrix} I & D \\ I & -D \end{bmatrix} \begin{bmatrix} y'' & 0 \\ 0 & FFT(x') \end{bmatrix} P$$

where D is a diagonal matrix containing the "twiddle factors" $w^k = e^{j\omega/n}$ and P is a permutation matrix (e.g. the so-called "perfect-shuffle permutation" to re-arrange the even and odd-indexed results of the partial FFTs).

In some embodiments, similar techniques may be used for encoding and decoding operations. For example, in some embodiments the number of instances of decoding operations performed in parallel (e.g., for polar decoding) may be different for the high-efficiency and high-performance pipes, and one or both of the pipes may be selected depending on decoding performance and power consumption goals. Further, many decoding techniques (e.g., using low-density party check codes or turbo codes) utilize matrix operations, which may be decomposed for slower performance by the high-efficiency pipe or performed directly by the high-performance pipe, for example.

Similar decompositions can be found for general tail-recursive problems (or so-called iterative algorithms). Although various examples herein utilize results from the high-efficiency pipeline as inputs to the high-performance pipeline for the same type of operations, this may not always be the case. For example, the high-efficiency pipe may perform one type of processing and provide results to the high-performance pipe for use as input to a different type of processing.

In various wireless communications systems, matrix operations, FFT operations, etc. may be used in signal processing for transmitting and receiving signals. In some embodiments, the system is configured to change between operating modes depending on the sizes of the operations that need to be performed (which may be based on the amount of resources assigned to a mobile device by the network, for example). In some embodiments, storing the context of the smaller instance may facilitate switching modes from a smaller problem to a larger problem, e.g., because the larger instance may use these intermediate results to being processing faster when switching to a higher-performance mode.

In some embodiments, the high-efficiency pipe may be solely utilized for communications that are not data-intensive, such as short message service (SMS) messages, iMessages, etc. In some embodiments, the apparatus may be configured to select the high-efficiency pipeline based on the type of application being executed (e.g., an SMS application). In other embodiments, the apparatus may be configured to select the high-efficiency pipeline based on the amount of data received for transmission, priority of the transmission, whether the transmission is time-sensitive, current channel conditions, etc. In some embodiments, the apparatus may be configured to select the high-performance pipeline for more data-intensive operations such as channel estimation, etc.

Exemplary Method

Figure 8:
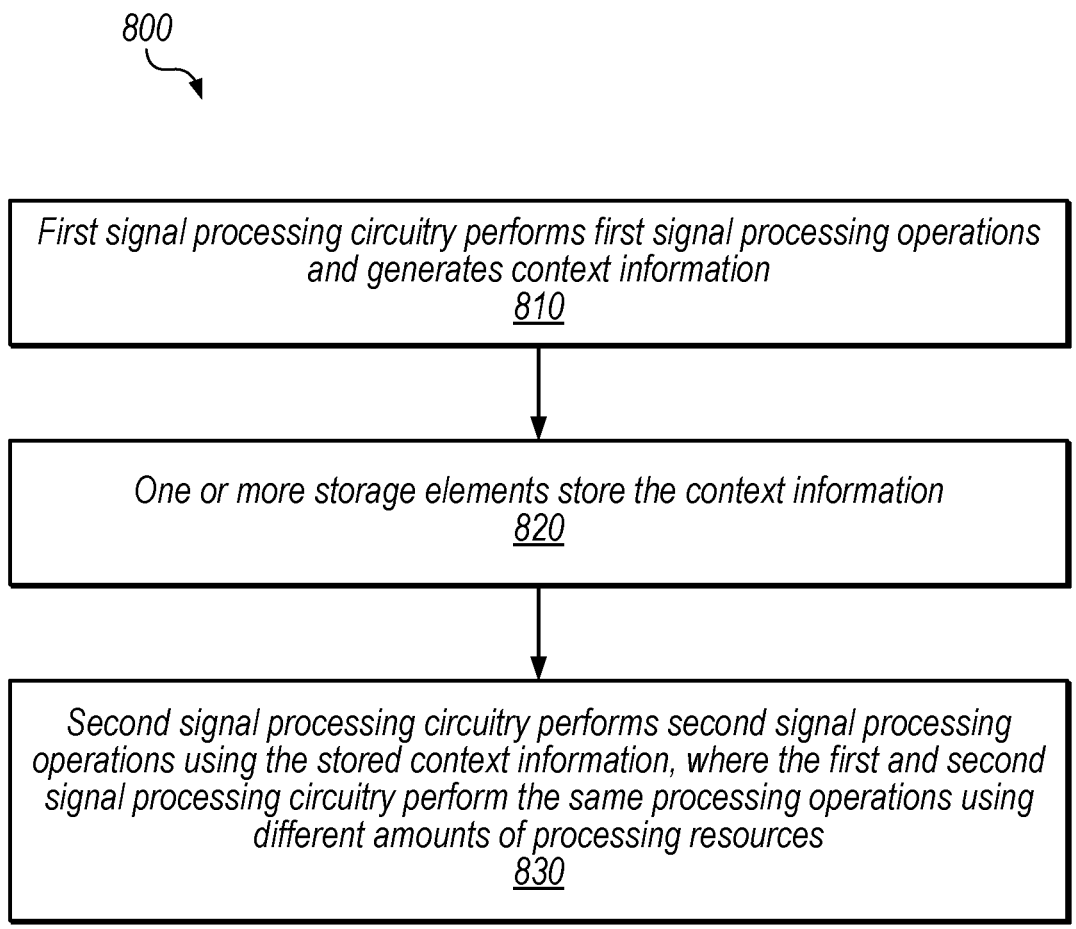
FIG. 8 is a flow diagram illustrating an exemplary method, according to some embodiments.

FIG. 8 is a flow diagram illustrating a method 800 for using different signal processing pipelines to perform operations, according to some embodiments. The method shown in FIG. 8 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 810, in the illustrated embodiment, first signal processing circuitry performs first signal processing operations and generates context information. The context information may include state information and/or intermediate computation results, for example.

At 820, in the illustrated embodiment, one or more storage elements store the context information. In some embodiments, the one or more storage elements are also accessible to second signal processing circuitry. In some embodiments, the one or more storage elements are dual-ported to allow parallel access. In some embodiments, control circuitry is configured to detect and avoid any conflicts between the first and second signal processing circuitry in accessing particular entries of the one or more storage elements.

At 830, in the illustrated embodiment, second signal processing circuitry performs second signal processing operations using the stored context information. In the illustrated embodiment, the first and second signal processing circuitry perform the same processing operations using different amounts of processing resources.

In various embodiments, the disclosed techniques may allow for power-efficient processing for smaller workloads and higher performance processing for larger workloads. This may reduce overall power consumption (which may in turn improve battery life) while maintaining or improving signal processing performance.

Figure 9:
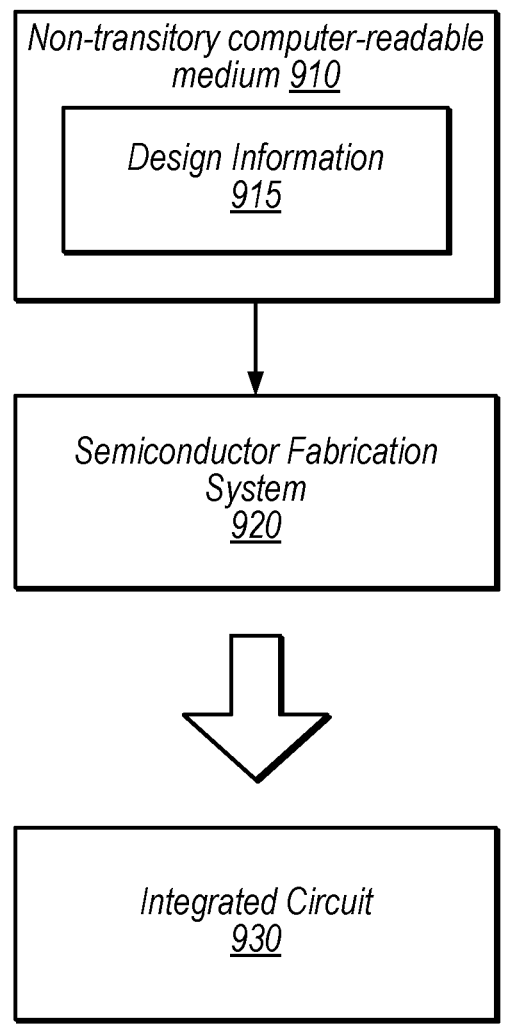
FIG. 9 is a block diagram illustrating an exemplary computer-readable medium, according to some embodiments.

FIG. 9 is a block diagram illustrating an exemplary non-transitory computer-readable storage medium that stores circuit design information, according to some embodiments. In the illustrated embodiment semiconductor fabrication system 920 is configured to process the design information 915 stored on non-transitory computer-readable medium 910 and fabricate integrated circuit 930 based on the design information 915.

Non-transitory computer-readable medium 910, may comprise any of various appropriate types of memory devices or storage devices. Medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 910 may include other types of non-transitory memory as well or combinations thereof. Medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabrication at least a portion of integrated circuit 930. The format of design information 915 may be recognized by at least one semiconductor fabrication system 920. In some embodiments, design information 915 may also include one or more cell libraries which specify the synthesis and/or layout of integrated circuit 930. In some embodiments, the design information is specified in whole or in part in the form of a netlist that specifies cell library elements and their connectivity.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIGS. 1-7. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   first signal processing circuitry configured to perform signal processing operations including a channel estimation procedure;
   second signal processing circuitry configured to perform the signal processing operations, wherein the second signal processing circuitry includes a smaller amount of processing resources than the first signal processing circuitry, wherein the second signal processing circuitry is configured to begin performing channel estimation on at least a portion of a set of input data while the first signal processing circuitry is in a low power state;
   one or more storage elements configured to store context information for the second signal processing circuitry, wherein the context information includes outputs from the channel estimation performed on the at least a portion of the set of input data, wherein the one or more storage elements are accessible to the first signal processing circuitry; and circuitry configured to, based on the at least a portion of the set of input data, activate the first signal processing circuitry to complete the channel estimation procedure using the outputs of the channel estimation performed by the second signal processing circuitry, included in the context information, as intermediate results.

2. The apparatus of claim 1, wherein the apparatus is configured to operate in at least three modes of operation, at different times, including:
   a first mode of operation in which the first signal processing circuitry is in a low-power mode and the second signal processing circuitry is active;
   a second mode of operation in which the second signal processing circuitry is in a low-power mode and the first signal processing circuitry is active; and
   a third mode of operation in which both the first signal processing circuitry and the second signal processing circuitry is active and configured to perform the signal processing operations in parallel.

3. The apparatus of claim 2, wherein the apparatus is configured to switch between ones of the first, second, and third modes based on communications resources allocated to the apparatus by a base station.

4. The apparatus of claim 2, wherein the apparatus is configured to switch between ones of the first, second, and third modes based analysis of input data to the first or second signal processing circuitry.

5. The apparatus of claim 1, wherein the context information includes state information.

6. The apparatus of claim 1, wherein the first signal processing circuitry is configured to perform the signal processing operations on larger input data sets than the second signal processing circuitry.

7. The apparatus of claim 1, wherein the first signal processing circuitry is configured to use smaller frequency transform results from the second signal processing circuitry as input to larger frequency transform operations.

8. The apparatus of claim 1, wherein the signal processing operations include one or more matrix operations, and wherein the second signal processing circuitry is configured to generate an intermediate result in the one or more storage elements that the apparatus is configured to use as an input for a larger matrix operation performed by the first signal processing circuitry.

9. The apparatus of claim 1, wherein the first signal processing circuitry includes at least one of:
   a higher-performance processor than the second signal processing circuitry;
   greater supply voltage levels than the second signal processing circuitry;
   transistors with higher leakage than the second signal processing circuitry;
   lower memory access times than the second signal processing circuitry;
   a greater amount of circuit area than the second signal processing circuitry; or
   a greater number of input ports than the second signal processing circuitry.

10. The apparatus of claim 1, wherein the one or more storage elements are dual-ported and configured to be accessed in parallel by the first signal processing circuitry and the second signal processing circuitry.

11. A method, comprising:
   first signal processing circuitry performing first signal processing operations and generating context information, including beginning to perform a channel estimation procedure on at least a portion of a set of input data while second signal processing circuitry is in a low power state;
   storing the generated context information using one or more storage elements, wherein the context information includes outputs of the channel estimation procedure performed on the at least a portion of the set of input data; and
   based on the at least a portion of the set of input data, activating the second signal processing circuitry to complete the channel estimation procedure using the outputs of the channel estimation performed by the second signal processing circuitry, included in the context information, as intermediate results, wherein the first and second signal processing circuitry perform the same processing channel estimation procedure using different amounts of processing resources.

12. The method of claim 11, further comprising:
   using both the first and second signal processing circuitry in parallel, in a mode of operation, to perform signal processing operations on a set of input data.

13. The method of claim 11, wherein the generated context information includes state information.

14. A non-transitory computer readable storage medium having stored thereon design information that specifies a design of at least a portion of a hardware integrated circuit in a format recognized by a semiconductor fabrication system that is configured to use the design information to produce the circuit according to the design, including:
   first signal processing circuitry configured to perform signal processing operations including a channel estimation procedure;
   second signal processing circuitry configured to perform the signal processing operations, wherein the second signal processing circuitry includes a smaller amount of processing resources than the first signal processing circuitry, wherein the second signal processing circuitry is configured to begin performing the channel estimation on at least a portion of a set of input data while the first signal processing circuitry is in a low power state;
   one or more storage elements configured to store context information for the second signal processing circuitry, wherein the context information includes outputs from the channel estimation performed on the at least a portion of the set of input data wherein the one or more storage elements are accessible to the first signal processing circuitry; and
   circuitry configured to, based on the at least a portion of the set of input data, activate the first signal processing circuitry to complete the channel estimation procedure using the outputs of the channel estimation performed by the second signal processing circuitry, included in the context information, as intermediate results.

15. The non-transitory computer readable storage medium of claim 14, wherein the design information specifies that the circuit is configured to operate in at least three modes of operation, at different times, including:
   a first mode of operation in which the first signal processing circuitry is in a low-power mode and the second signal processing circuitry is active;
   a second mode of operation in which the second signal processing circuitry is in a low-power mode and the first signal processing circuitry is active; and
   a third mode of operation in which both the first signal processing circuitry and the second signal processing circuitry is active and configured to perform the signal processing operations in parallel.

16. The non-transitory computer readable storage medium of claim 15, wherein the design information specifies that the circuit is configured to switch between ones of the first, second, and third modes based on communication resources allocated, to a device that includes the circuit, by a base station.

17. The non-transitory computer readable storage medium of claim 14, wherein the signal processing operations include a frequency transform operation.

18. The apparatus of claim 1, wherein the signal processing operations further comprise one or more of: a frequency transform, signal decoding, or matrix operations.

* * * * *